United States Patent
Lin et al.

(10) Patent No.: US 12,231,764 B2
(45) Date of Patent: *Feb. 18, 2025

(54) IMAGE CAPTURING METHOD

(71) Applicant: Gogoro Inc., Hong Kong (CN)

(72) Inventors: Yi-Chia Lin, Taoyuan (TW); Chih-Min Fu, Taoyuan (TW); I-Fen Shih, Taoyuan (TW)

(73) Assignee: GOGORO INC., Hong Kong (CN)

( * ) Notice: Subject to any disclaimer, the term of this patent is extended or adjusted under 35 U.S.C. 154(b) by 341 days.

This patent is subject to a terminal disclaimer.

(21) Appl. No.: 17/815,875

(22) Filed: Jul. 28, 2022

(65) Prior Publication Data

US 2023/0139846 A1    May 4, 2023

(30) Foreign Application Priority Data

Nov. 2, 2021    (TW) .................. 110140812

(51) Int. Cl.
*G06V 10/00* (2022.01)
*G06T 7/70* (2017.01)
(Continued)

(52) U.S. Cl.
CPC .............. *H04N 23/64* (2023.01); *G06T 7/70* (2017.01); *G06V 20/625* (2022.01); *G06T 2207/30252* (2013.01); *G06V 2201/08* (2022.01)

(58) Field of Classification Search
CPC .. G06V 20/625; G06V 2201/08; H04N 23/64; H04N 23/635; H04N 23/633;
(Continued)

(56) References Cited

U.S. PATENT DOCUMENTS 8,644,561 B2 * 2/2014 Burry .................... G06F 18/243
                                                                382/107
9,558,419 B1 * 1/2017 Wilbert ................ H04N 23/633
(Continued)

FOREIGN PATENT DOCUMENTS

CN    106713431 A    5/2017
CN    109636507 A    4/2019
(Continued)

OTHER PUBLICATIONS

Office Action mailed Nov. 21, 2023 for Korean Patent Application No. KR10-2022-0111392, 5 pages.
(Continued)

*Primary Examiner* — Amir Alavi
(74) *Attorney, Agent, or Firm* — Perkins Coie LLP

(57) ABSTRACT

An image capturing method has: providing an image capturing area on a display screen of a user device; providing an indication area in the image capturing area; marking a license plate after identifying the license plate based on at least one license plate feature in the image capturing area; determining whether the marked license plate is located in the indication area and presented in a predetermined ratio; and capturing an image including the license plate in the image capturing area after the marked license plate is located in the indication area and presented in a predetermined ratio.

10 Claims, 5 Drawing Sheets

(51) Int. Cl.
  *G06V 20/62* (2022.01)
  *H04N 23/60* (2023.01)
(58) Field of Classification Search
  CPC ...... H04N 23/631; H04N 23/632; G06T 7/70;
  G06T 2207/30252
  See application file for complete search history.

(56) References Cited

U.S. PATENT DOCUMENTS

| | | | |
|---|---|---|---|
| 10,769,476 B2* | 9/2020 | Pu | G06V 10/46 |
| 10,867,327 B1* | 12/2020 | Wilbert | G06Q 30/0611 |
| 11,461,927 B2* | 10/2022 | Chun | G06T 7/74 |
| 11,527,057 B2* | 12/2022 | Chua | G06F 18/2415 |
| 11,645,857 B2* | 5/2023 | Zeng | G06V 30/1916 |
| | | | 382/105 |
| 2003/0167666 A1* | 9/2003 | Close, Jr. | G09F 9/33 |
| | | | 40/452 |
| 2017/0278311 A1* | 9/2017 | Vespia | G06V 20/52 |
| 2018/0300578 A1 | 10/2018 | Wilbert et al. | |
| 2021/0390734 A1* | 12/2021 | Chun | G06V 10/25 |
| 2023/0138373 A1* | 5/2023 | Lin | H04N 23/633 |
| | | | 382/105 |
| 2023/0139846 A1* | 5/2023 | Lin | G06V 20/625 |
| | | | 382/105 |

FOREIGN PATENT DOCUMENTS

| | | |
|---|---|---|
| EP | 3709219 A1 | 9/2020 |
| JP | 2007086858 A | 4/2007 |
| JP | 2011113440 A | 6/2011 |
| JP | 2018166282 A | 10/2018 |
| JP | 2018530808 A | 10/2018 |
| JP | 2021067807 A | 4/2021 |
| JP | 2021083073 A | 5/2021 |
| JP | 2021105836 A | 7/2021 |
| KR | 20160121242 A | 10/2016 |
| KR | 20200062419 A | 6/2020 |
| KR | 102223059 B1 | 3/2021 |
| TW | 201528159 A | 7/2015 |

OTHER PUBLICATIONS

Office Action mailed on Oct. 28, 2022 for Taiwanese Patent Application No. 110140812, 8 pages.
India Office Action mailed Feb. 22, 2024 in App. 202111050363 with English translation.
Yogheedha et al., Automatic vehicle license plate recognition system based on image processing and template matching approach, DOI:10.1109/ICASSDA.2018.8477639, Conference of Aug. 15-17, 2018, published in IEEE, 2018.
European Search Report mailed Apr. 22, 2022 for European Patent Application No. 21205976.0, 4 pages.
Office Action mailed Aug. 9, 2022 for Japanese Patent Application No. 2021-179143, 5 pages.
Office Action mailed on Aug. 31, 2022 for Taiwanese Patent Application No. 110140812, 7 pages.
Office Action mailed Feb. 14, 2023 in Japanese Patent Application No. 2021-179143, 4 pages.
Notice of Allowance for Japanese Patent Application No. 2021-179143, mailed Jul. 25, 2023, 3 pages.

* cited by examiner

IMAGE CAPTURING METHOD

CROSS-REFERENCE TO RELATED APPLICATION

This application claims priority to Taiwan Application Serial Number 110140812, filed Nov. 2, 2021, which is herein incorporated by reference.

BACKGROUND

Technical Field

The present disclosure relates to an image capturing method.

Description of Related Art

Shared motor vehicles provide a lot of convenience for the people. The rent-and-return characteristic combined with electric motor vehicles allows users to move more maneuverable and have a longer travel distance than shared bicycles, while also taking into account the environmental protection effect.

However, the shared motor vehicles are also often disputed because of the rental and return characteristic. For example, after returning a motor vehicle, the user will receive a ticket due to the movement of the motor vehicle by others. The user will have a poor user experience due to the failure to provide proof of returning the motor vehicle.

Accordingly, how to provide an image capturing method to solve the aforementioned problems becomes an important issue to be solved by those in the industry.

SUMMARY

An aspect of the disclosure is to provide an image capturing method that can efficiently solve the aforementioned problems.

According to an embodiment of the disclosure, an image capturing method includes: providing an image capturing area on a display screen of a user device; providing an indication area in the image capturing area; marking a license plate after identifying the license plate based on at least one license plate feature in the image capturing area; determining whether the marked license plate is located in the indication area and presented in a predetermined ratio; and capturing an image including the license plate in the image capturing area after the marked license plate is located in the indication area and presented in a predetermined ratio.

In an embodiment of the disclosure, the at least one license plate feature includes English letters and numbers with a predetermined format/number of characters and a predetermined aspect ratio of license plate.

In an embodiment of the disclosure, the predetermined ratio is a ratio of the license plate located in the indication area to the image capturing area.

In an embodiment of the disclosure, the image capturing method further includes: further providing an operation area on the display screen, in which the operation area and the image capturing area are side by side.

In an embodiment of the disclosure, the operation area provides at least one of a shooting virtual button, a flash virtual button, a re-shooting virtual button, and an upload virtual button.

In an embodiment of the disclosure, the image capturing method further includes: further providing a guidance information display area in the image capturing area.

In an embodiment of the disclosure, the guidance information display area provides a dialog box or a timing indicator.

In an embodiment of the disclosure, the image capturing method further includes: when the marked license plate is not located in the indication area and/or is not presented in the predetermined ratio, providing a guide description in a guidance information display area.

In an embodiment of the disclosure, the image capturing method further includes: when the marked license plate is located in the indication area and presented in the predetermined ratio, providing a timing indicator in a guidance information display area.

In an embodiment of the disclosure, the capturing the image includes: capturing the image at an end of countdown of the timing indicator after the marked license plate is located in the indication area and presented in a predetermined ratio.

Accordingly, in the image capturing method of the present disclosure, the indication area provided in the image capturing area can guide the user to obtain an image with a specific composition to ensure that the image is saved with specific information. By guiding the user to display the license plate in the indication area in a predetermined ratio, the safety of the user in the process of capturing images can be improved. By marking the license plate, the user's recognition of the license plate can be improved, thereby reducing the time for the user to capture images. By limiting that the image is captured only when the marked license plate is present in the indication area in the predetermined ratio for a predetermined period of time, the stability of capturing the image can be increased to make the obtained image clearer. By combining the image capturing method with a vehicle return system, the user can be assisted to save the return record by capturing images, so as to reduce return disputes.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
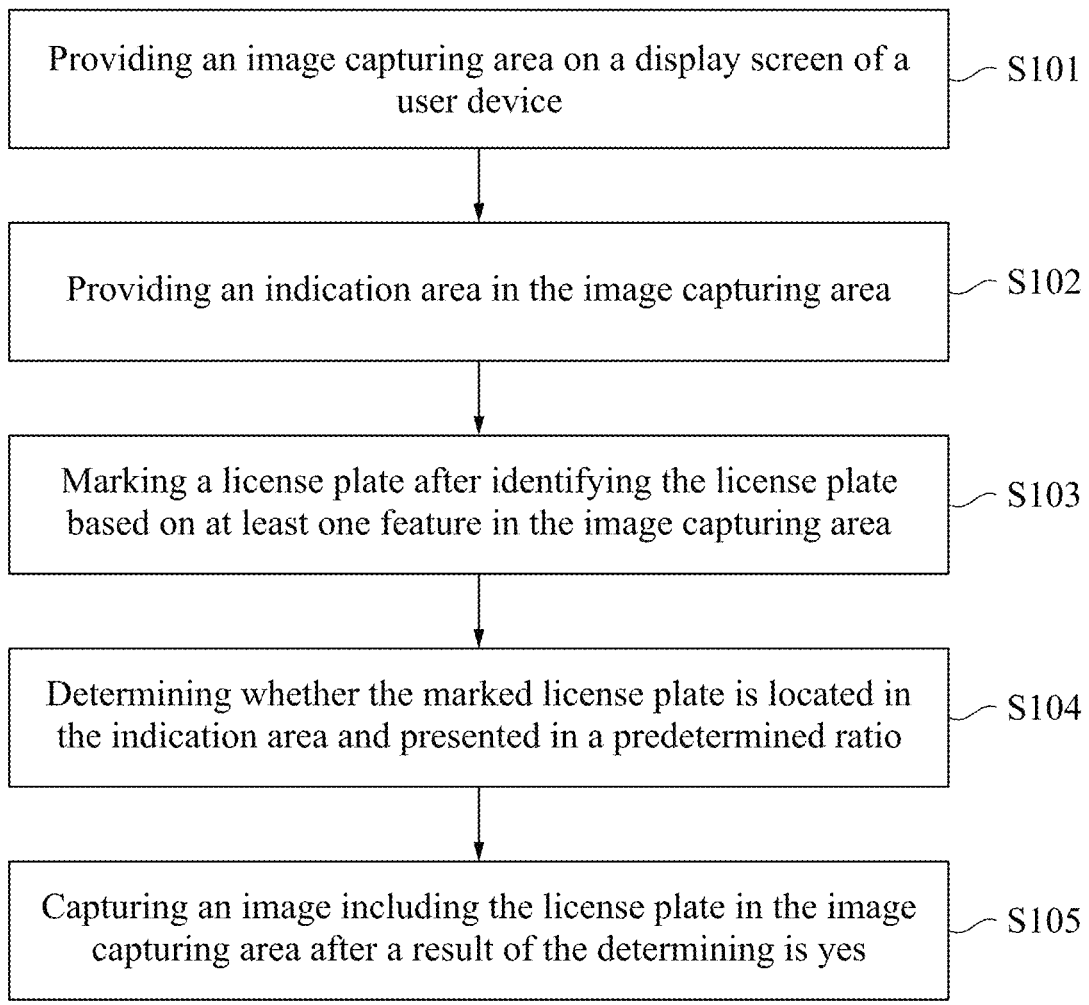
FIG. 1 is a flow chart of an image capturing method according to an embodiment of the present disclosure.

Reference will now be made in detail to the present embodiments of the disclosure, examples of which are illustrated in the accompanying drawings. Wherever possible, the same reference numbers are used in the drawings and the description to refer to the same or like parts. However, specific structural and functional details disclosed herein are merely representative for purposes of describing example embodiments, and thus may be embodied in many alternate forms and should not be construed as limited to only example embodiments set forth herein. Therefore, it should be understood that there is no intent to limit example embodiments to the particular forms disclosed, but on the contrary, example embodiments are to cover all modifications, equivalents, and alternatives falling within the scope of the disclosure.

Reference is made to FIG. 1 with reference to FIGS. 2 to 5 together. FIG. 1 is a flow chart of an image capturing method according to an embodiment of the present disclosure. FIGS. 2 to 5 are schematic diagrams respectively showing different steps of the image capturing method according to an embodiment of the present disclosure. As shown in FIG. 1, in the present disclosure, the image capturing method mainly includes step S101 to step S105.

Step S101: providing an image capturing area 111 on a display screen 110 of a user device 100.

Step S102: providing an indication area 112 in the image capturing area 111.

Step S103: marking a license plate 900 after identifying the license plate 900 based on at least one feature in the image capturing area 111.

Step S104: determining whether the marked license plate 900 is located in the indication area 112 and presented in a predetermined ratio.

Step S105: capturing an image including the license plate 900 in the image capturing area 111 after a result of the determining is yes (i.e., the marked license plate 900 is located in the indication area 112 and presented in a predetermined ratio).

In some embodiments, the user device 100 is, for example, a smart phone, but the disclosure is not limited in this regard. In some embodiments, the user device 100 further includes a camera module (not shown). The camera module is configured to take pictures of the surroundings of the user device 100. The display screen 110 is configured to display the scene shot by the camera module in the image capturing area 111.

As shown in FIGS. 2 to 5, in the present embodiment, in the image capturing area 111, a scene of a vehicle with a license plate 900 is taken as an example.

In some embodiments, the at least one feature may be the license plate features including English letters and numbers with a predetermined format/number of characters and a predetermined aspect ratio of license plate, but the disclosure is not limited in this regard. For example, the predetermined format may include a font format and/or an arrangement order format of the English letters and numbers of license plates of various types of traffic vehicles that comply with local regulations, but the disclosure is not limited in this regard. For example, the predetermined aspect ratio of license plate may be a specific range of aspect ratios of the license plates of the various traffic vehicles that comply with local regulations.

Figure 2:
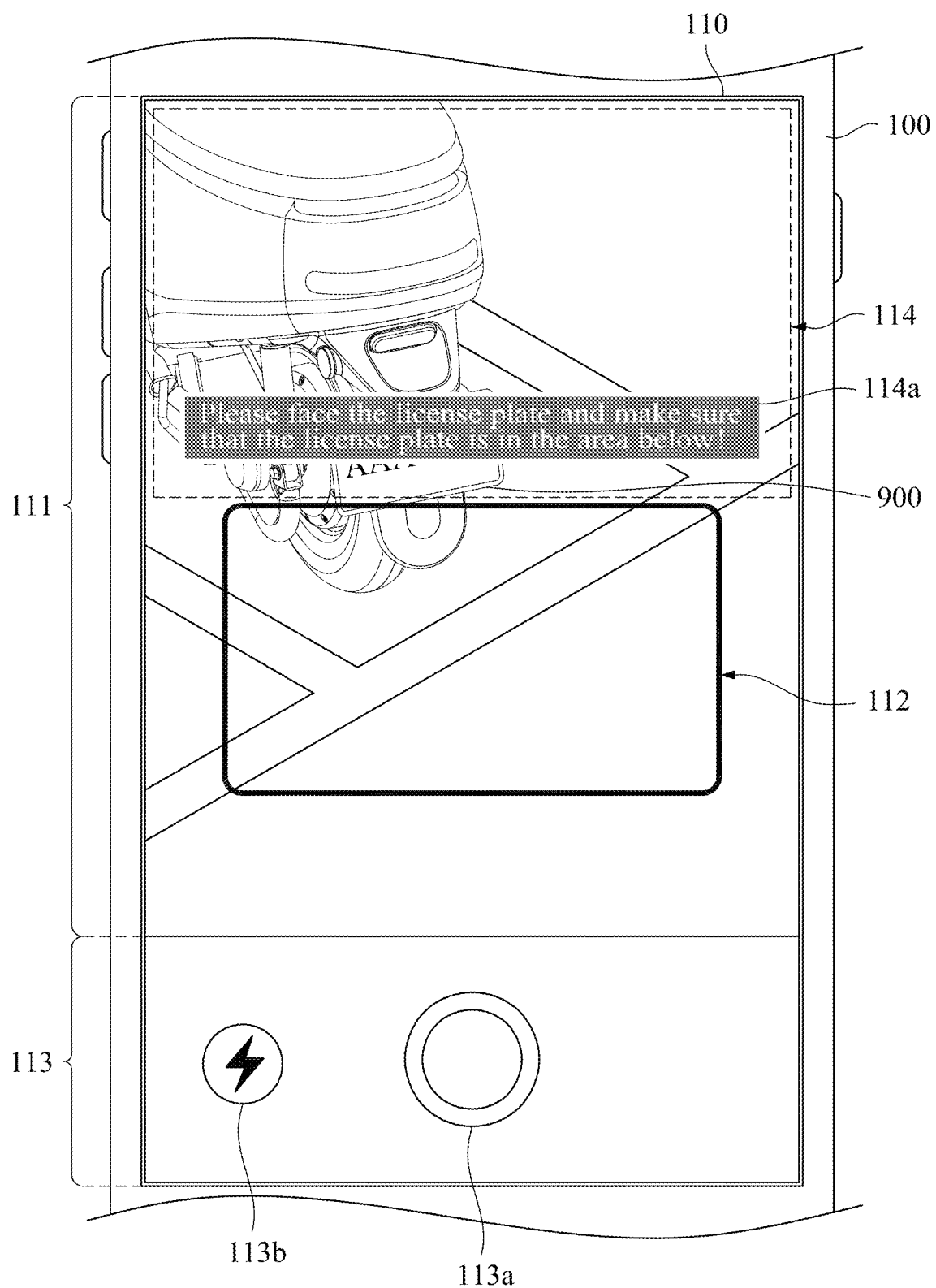
FIG. 2 is a schematic diagram showing one of steps of the image capturing method according to an embodiment of the present disclosure.

As shown in FIG. 2, in the present embodiment, since the camera module does not shot directly behind the vehicle, the aspect ratio of the license plate 900 displayed in the image capturing area 111 does not meet the predetermined aspect ratio of license plate, and the license plate 900 is not recognized or marked because it does not have the aforementioned at least one feature.

In some embodiments, the image capturing method further includes step S106*a*.

Step S106*a*: further providing a guidance information display area 114 in the image capturing area 111.

As shown in FIG. 2, in the present embodiment, the guidance information display area 114 is indicated by a dotted line. The guidance information display area 114 provides a dialog box. When step S103 is performed according to the image capturing method of the present disclosure but the license plate 900 is not recognized in the image capturing area 111, the guidance information display area 114 may provide the dialog box 114*a* and display a guide description in the dialog box 114*a*. For example, the dialog box 114*a* may display the guide description "Please face the license plate and make sure that the license plate is in the area below!", but the disclosure is not limited in this regard. The foregoing guide description may indicate the user to move the user device 100 so that the camera module can shoot from the rear of the vehicle, so that the license plate 900 can be recognized in the image capturing area 111.

In some embodiments, the image capturing method further includes step S106*b*.

Step S106*b*: when the marked license plate 900 is not located in the indication area 112 and/or is not presented in the predetermined ratio, providing a guide description in the guidance information display area 114.

Figure 3:
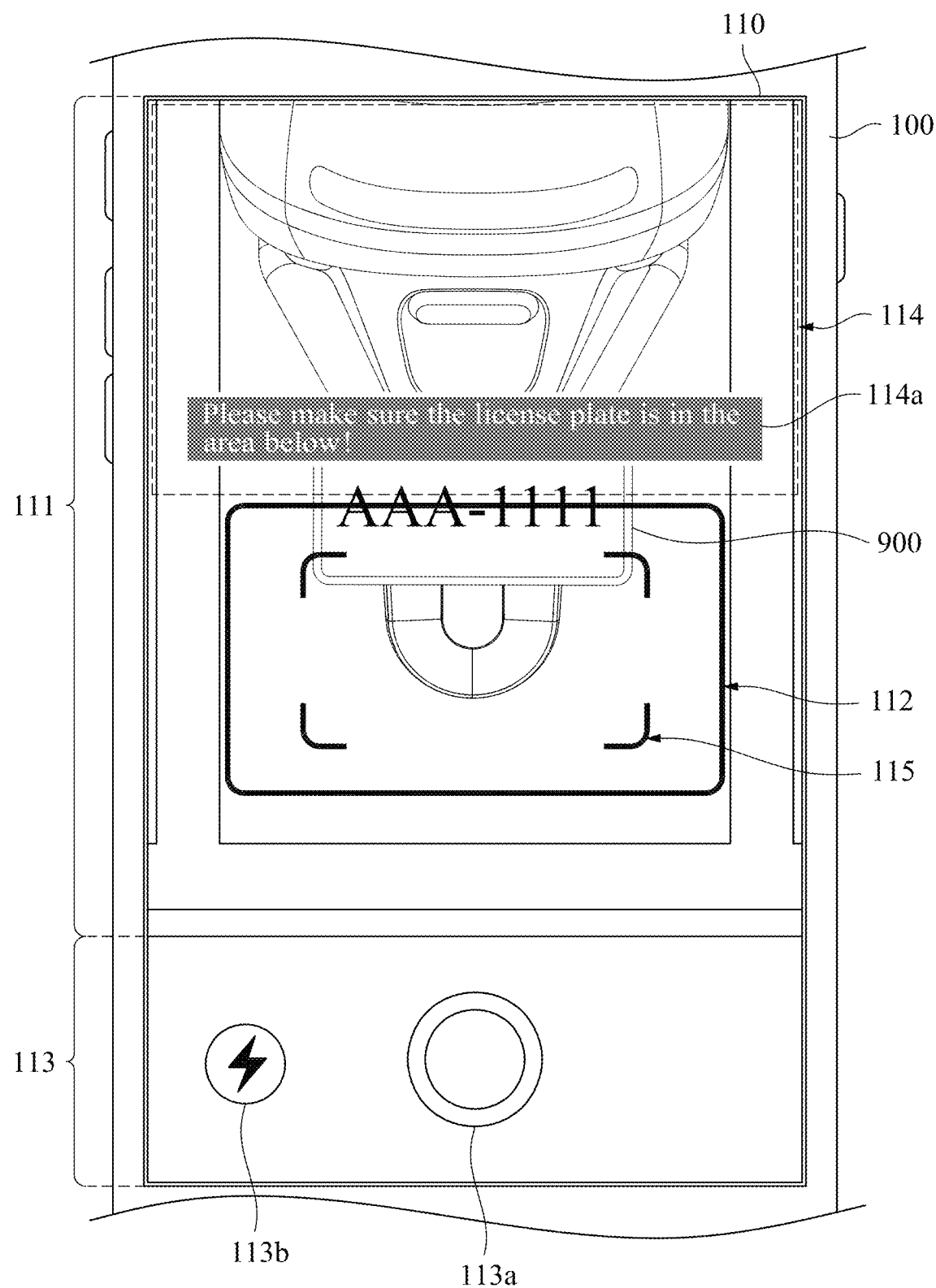
FIG. 3 is a schematic diagram showing one of steps of the image capturing method according to an embodiment of the present disclosure.

As shown in FIG. 3, in the present embodiment, when step S104 is performed according to the image capturing method of the present disclosure but it is found that the marked license plate 900 (of a rental vehicle) is not located in the indication area 112, the guidance information display area 114 may provide the dialog box 114*a* and display a guide description in the dialog box 114*a*. For example, the dialog box 114*a* may display the guide description "Please make sure the license plate is in the area below!", but the disclosure is not limited in this regard. The aforementioned guide description may indicate the user to move the user device 100 to adjust the viewing angle of the camera module, so that the marked license plate 900 can be located in the indication area 112.

In some embodiments, when step S104 is performed according to the image capturing method of the present disclosure but it is found that the marked license plate 900 is not presented in the predetermined ratio, the guidance information display area 114 may provide the dialog box 114*a* and display a guide description in the dialog box 114*a*. For example, the dialog box 114*a* may display the guide description "Please come closer!", but the disclosure is not limited in this regard. The aforementioned guide description may indicate the user to move the user device 100 to adjust the distance between the camera module and the license plate 900, so that the marked license plate 900 is displayed in the indication area 112 in the predetermined ratio. In this way, the personal safety problem caused by the user being too close to the lane can be avoided.

In some embodiments, the predetermined ratio is a ratio of the license plate 900 located in the indication area 112 to the image capturing area 111 (for example, a width ratio or an area ratio), but the disclosure is not limited in this regard. For example, the width ratio of the license plate 900 to the image capturing area 111 is between ¼ and ¾, but the disclosure is not limited in this regard.

In some embodiments, the image capturing method further includes step S103*a*.

Step S103*a*: providing a marking area 115 in the image capturing area 111 111 to mark the license plate 900.

Figure 4:
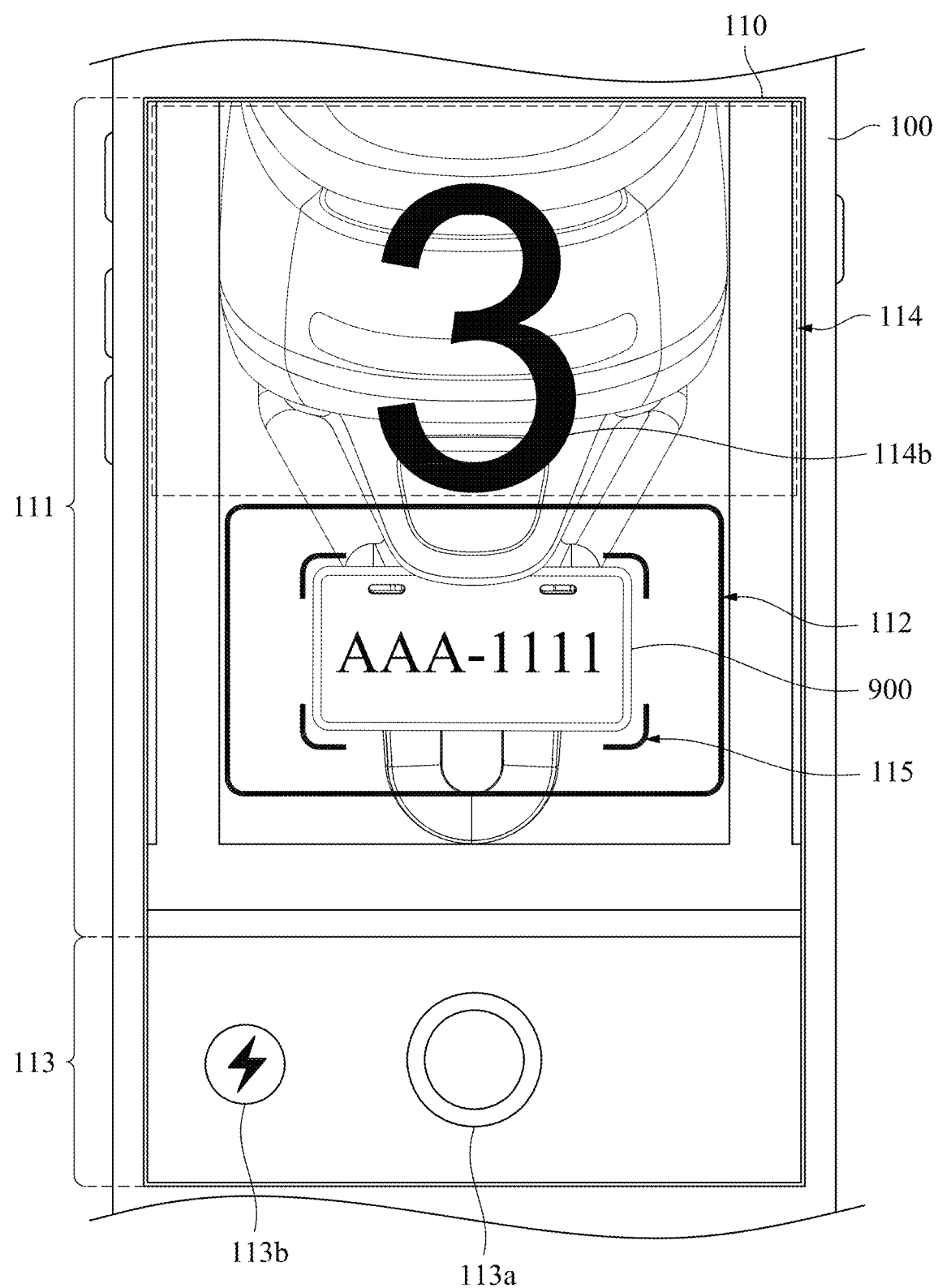
FIG. 4 is a schematic diagram showing one of steps of the image capturing method according to an embodiment of the present disclosure.

As shown in FIGS. 2 to 4, in the present embodiment, the indication area 112 may be marked by a frame formed by a solid line, and the marking area 115 may be marked by a frame formed by a dotted line, so as to improve the clarity of identification when the user operates the user device 100, but the disclosure is not limited in this regard. In practical applications, the indication area 112 and the marking area 115 may also be marked with different types or colors of frame or color blocks.

In some embodiments, the image capturing method further includes step S106c.

Step S106c: when the marked license plate 900 is located in the indication area 112 and presented in the predetermined ratio, providing a timing indicator 114b in the guidance information display area 114.

As shown in FIG. 4, in the present embodiment, when step S104 is performed according to the image capturing method of the present disclosure and it is found that the marked license plate 900 is presented in the predetermined ratio, the guidance information display area 114 may provide the timing indicator 114b. For example, the timing indicator 114b may be presented in the form of numbers, but the disclosure is not limited in this regard. For example, the timing indicator 114b may count down from 3, but the disclosure is not limited in this regard.

In some embodiments, step S105 further includes step S105a.

Step S105a: capturing the image at an end of countdown of the timing indicator 114b if the result of the determining is yes (i.e., the marked license plate 900 is located in the indication area 112 and presented in a predetermined ratio).

Figure 5:
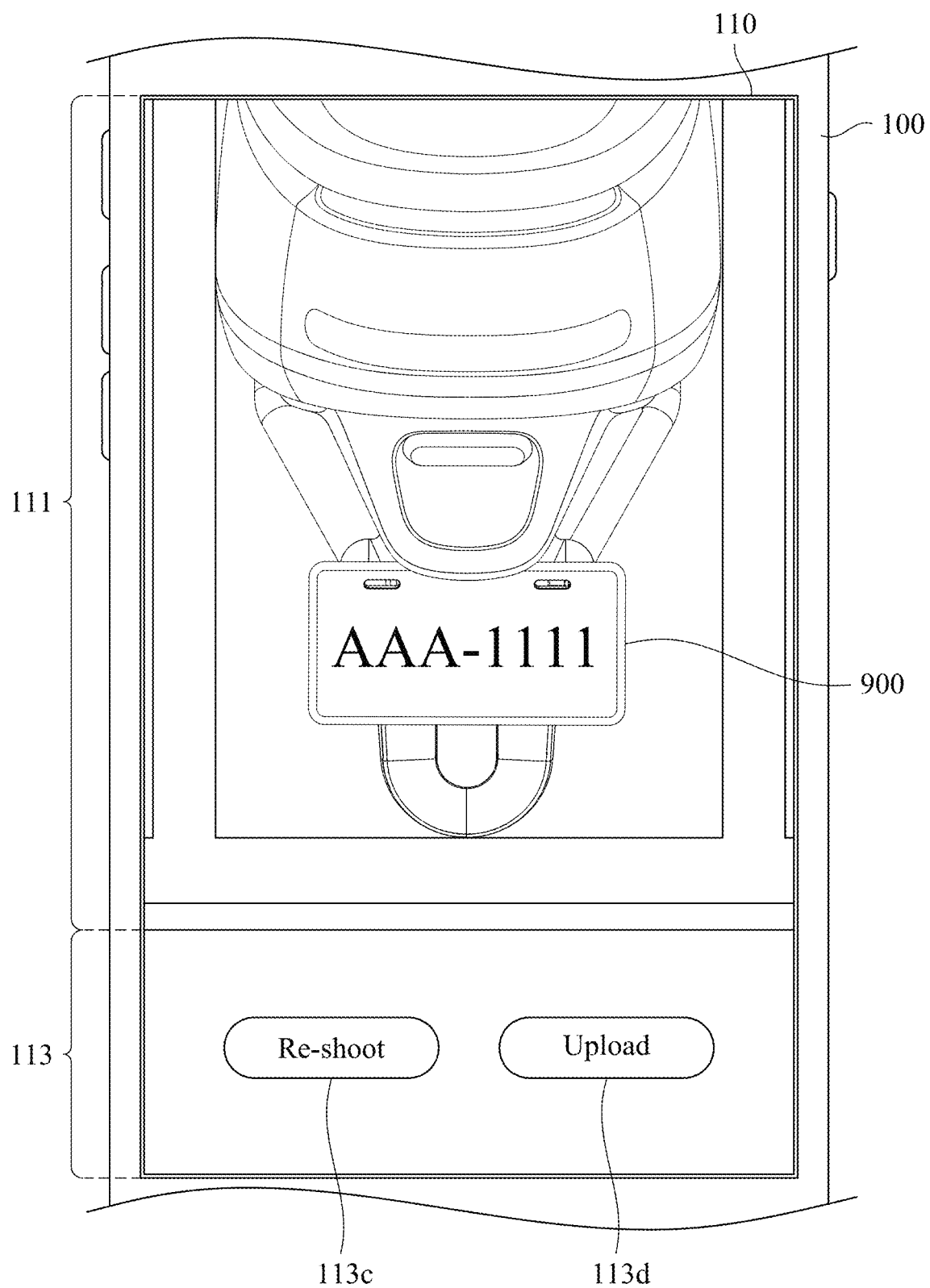
FIG. 5 is a schematic diagram showing one of steps of the image capturing method according to an embodiment of the present disclosure.

As shown in FIG. 5, the image presented in the image capturing area 111 is the image captured when the countdown of the timing indicator 114b ends.

In some embodiments, the image capturing method further includes step S107.

Step S107: further providing an operation area 113 on the display screen 110, in which the operation area 113 and the image capturing area 111 are side by side.

As shown in FIGS. 2 to 5, the image capturing area 111 and the operation area 113 are arranged side by side on the display screen 110 up and down, but the disclosure is not limited in this regard.

As shown in FIGS. 2 to 4, in the present embodiment, the operation area 113 may provide a shooting virtual button 113a and a flash virtual button 113b, but the disclosure is not limited in this regard. The shooting virtual button 113a may provide a function of manually capturing an image for a user who does not need to automatically capture the image based on the image capturing method of the present disclosure. The flash virtual button 113b may provide a function for the user to select whether to enable the camera module to turn on the flash when capturing the image.

As shown in FIG. 5, in the present embodiment, after the image is captured based on the image capturing method of the present disclosure, the operation area 113 may provide a re-shooting virtual button 113c and an upload virtual button 113d, but the disclosure is not limited in this regard. The re-shooting virtual button 113c may provide the user with a function of re-shooting an image. The upload virtual button 113d may provide the user with a function of uploading the captured image to a cloud storage device of a vehicle return system as a proof of returning the rental vehicle.

In some embodiments, when uploading the captured image, the satellite positioning information of the location of the captured image can be sent at the same time to more clearly record the parking position (return position) of the vehicle. The clear location of the vehicle can help the user find the vehicle more quickly the next time it is used, thereby saving the user the time to find the vehicle.

In some embodiments, the image capturing method of the present disclosure can be combined with a vehicle return system, so as to assist the user to save the return record by capturing images and thus reduce return disputes. For example, the image capturing method disclosed in the present disclosure can prevent the user from paying additional rental fees or paying a ticket because the vehicle is moved by others after returning the vehicle.

According to the foregoing recitations of the embodiments of the disclosure, it can be seen that in the image capturing method of the present disclosure, the indication area provided in the image capturing area can guide the user to obtain an image with a specific composition to ensure that the image is saved with specific information. By guiding the user to display the license plate in the indication area in a predetermined ratio, the safety of the user in the process of capturing images can be improved. By marking the license plate, the user's recognition of the license plate can be improved, thereby reducing the time for the user to capture images. By limiting that the image is captured only when the marked license plate is present in the indication area in the predetermined ratio for a predetermined period of time, the stability of capturing the image can be increased to make the obtained image clearer. By combining the image capturing method with a vehicle return system, the user can be assisted to save the return record by capturing images, so as to reduce return disputes.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An image capturing method, comprising:
providing an image capturing area on a display screen of a user device;
providing an indication area in the image capturing area;
marking a license plate after identifying the license plate based on at least one license plate feature in the image capturing area;
determining whether the marked license plate is located in the indication area and presented in a predetermined ratio; and
capturing an image including the license plate in the image capturing area after the marked license plate is located in the indication area and presented in a predetermined ratio.

2. The image capturing method of claim 1, wherein the at least one license plate feature comprises English letters and numbers with a predetermined format/number of characters and a predetermined aspect ratio of license plate.

3. The image capturing method of claim 1, wherein the predetermined ratio is a ratio of the license plate located in the indication area to the image capturing area.

4. The image capturing method of claim 1, further comprising:
further providing an operation area on the display screen, wherein the operation area and the image capturing area are side by side.

5. The image capturing method of claim 4, wherein the operation area provides at least one of a shooting virtual button, a flash virtual button, a re-shooting virtual button, and an upload virtual button.

6. The image capturing method of claim 1, further comprising:
further providing a guidance information display area in the image capturing area.

7. The image capturing method of claim 6, wherein the guidance information display area provides a dialog box or a timing indicator.

8. The image capturing method of claim 1, further comprising:
when the marked license plate is not located in the indication area and/or is not presented in the predetermined ratio, providing a guide description in a guidance information display area.

9. The image capturing method of claim 1, further comprising:
when the marked license plate is located in the indication area and presented in the predetermined ratio, providing a timing indicator in a guidance information display area.

10. The image capturing method of claim 9, wherein the capturing the image comprises:
capturing the image at an end of countdown of the timing indicator after the marked license plate is located in the indication area and presented in a predetermined ratio.

* * * * *